Sept. 26, 1933.   G. E. STANLEY   1,927,995
PLATE CLUTCH
Filed Aug. 1, 1931
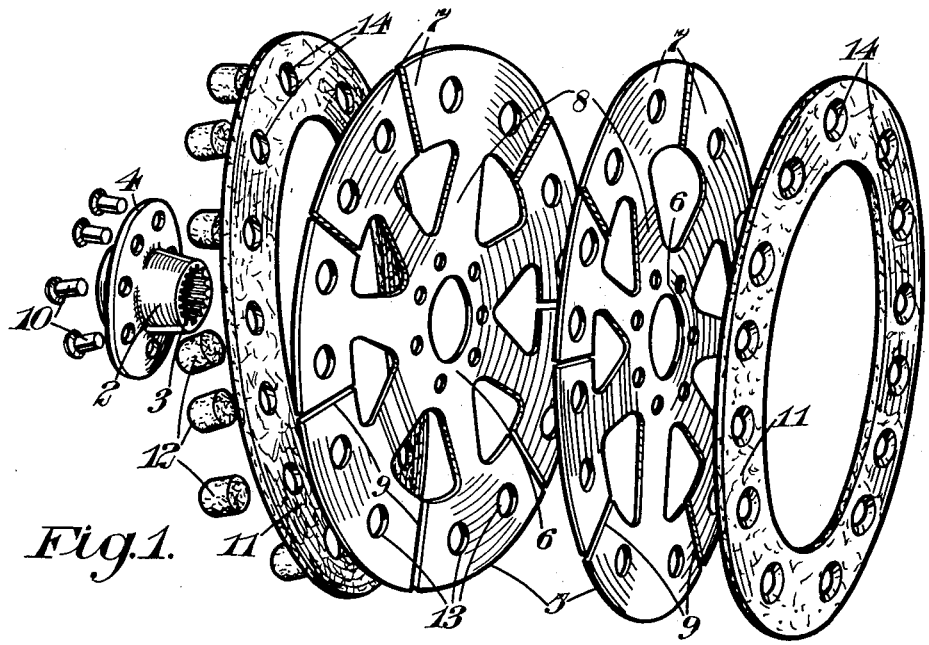
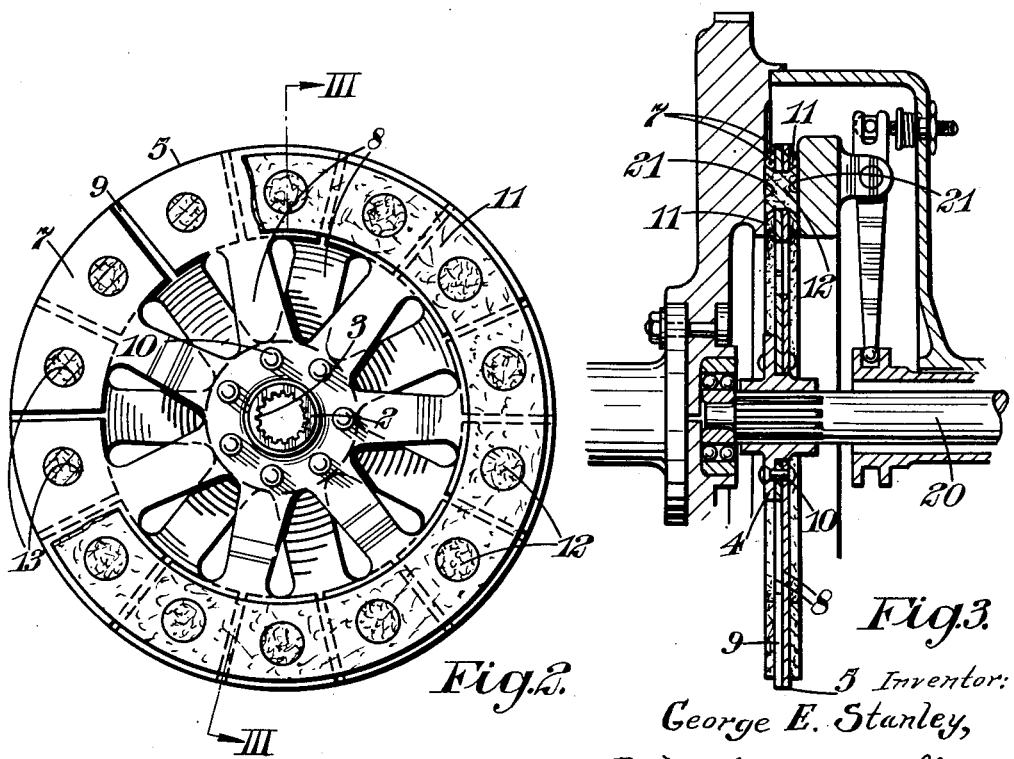
Inventor:
George E. Stanley,
By Mawhinney & Mawhinney,
Attys.

Patented Sept. 26, 1933

1,927,995

UNITED STATES PATENT OFFICE 1,927,995

PLATE CLUTCH

George Enoch Stanley, Coventry, England, assignor to Small & Parkes Limited, Manchester, England Application August 1, 1931, Serial No. 554,564, and in Great Britain December 20, 1930

9 Claims. (Cl. 192—107)

This invention relates to plate clutches, particularly for automobiles, and it has for its main object to provide an improved construction whereby a very smooth operation of the clutch can be obtained. A further object is to provide a clutch plate which is capable of very accurate alignment with its co-operating friction surface or surfaces. A still further object is to provide an improved clutch which can be operated with a lower clamping pressure than usual, whilst the elements will have at least a normal life.

To this end the invention consists of various features which are pointed out specifically in the claims hereto appended and the nature of which is hereinafter described in connection with the accompanying drawing.

According to one feature of the invention, a clutch plate is formed of flexible laminations having rim portions which overlap and always contact with one another. Preferably the laminations are spiders having rim portions which are able to slide over one another, while the centres are rigidly united.

It is common practice, at the present time, for the clutch engagement to be effected between a friction annulus, formed of a specially-prepared fabric, and a metal plate or disc. It is preferred, in carrying out the present invention, that the friction annulus should be supported, and in a flexible manner, from the laminated clutch plate, rather than from the co-operating metal plate or disc, for example, the engine flywheel, as in that case the heat generated during engagement is more easily dissipated.

According to a further feature of the invention, a clutch plate, whether laminated or not, has a friction annulus flexibly attached to it solely by cork rivets.

According to a still further feature, a clutch plate includes a centre piece on which thin metal spider laminations are rigidly mounted in staggered relation, each lamination having a rim divided into arcuate portions, and a friction annulus which is secured to an exterior face of a rim by flexible rivets with friction faces.

In the accompanying drawing,

Figure 1 is a perspective view of the various parts of a clutch plate in accordance with the invention, the same being shown before assembly for clearness, Figure 2 is a plan of the assembled plate, and Figure 3 is a section on the line III—III of Figure 2, showing also a driving disc and a driven shaft slidably carrying the clutch plate.

Like numerals indicate like parts throughout the drawing.

In the construction shown in the drawing, the centre piece 2 of the clutch plate is bored axially and internally splined at 3, for sliding in known manner on splines on the driven shaft 20 and provided with a radial flange 4. The clutch plate is built up from two identical sheet steel spider pressings 5, 5, each having a continuous inner rim 6 and a discontinuous outer rim 7, the latter being broken up into a number of arcuate portions (for example, one for each arm 8 of the spider) which are separated circumferentially from one another by slits 9. The two spider laminations are staggered angularly with respect to one another, as shown clearly in Figure 2, and they fit over the centre piece 2 and are rigidly secured to the flange 4 by rivets 10.

In the case of a clutch plate which is to engage metal plates or discs or other friction surfaces 21, 21 on its opposite sides, as shown in Figure 3, annuli 11, 11 of frictional composition are secured to the outer rims 7 on opposite sides thereof by means of flexible rivets 12, 12, of which there are shown two for each arcuate section of the rim.

A preferred material for the rivets is cork. Conveniently the outer rims 7 are provided with holes 13, 13 during the original pressing operation to receive the cork rivets, the annuli 11, 11 being provided with corresponding holes 14, 14 which are flared outwardly. The cork rivets, which are oversize, are then inserted through the holes 13, 14, when in register, and compressed to fill these composite holes fully, the arrangement preferably being such that the outer surfaces of the cork inserts are flush with the surfaces of the annuli, as it has been found in practice that the friction fabric wears quicker than the cork faces, owing to their flexible nature, and the cork faces become slightly proud of the surfaces of the annuli as these latter wear.

With the construction illustrated, the annuli 11, 11 can flex relatively to the centre piece in a large variety of ways. Owing to the flexible connection of the annuli to the spider laminations, each annulus can move entirely parallel to itself with respect to the centre piece 2, whilst the laminations can slide slightly upon one another and the arms undergo a double flexing, to a greater extent than if the plate were a non-laminated one, and by this means tilting of the annuli can be reduced. Owing to the outer rim 7 being split up into arcuate sections, such movements can be effected to a greater or less extent by different parts of the annuli. In consequence the frictional surfaces of the clutch plate can be very accurately aligned with the co-operating frictional surfaces 21, 21, and by this means a very smooth clutch effect can be obtained.

The rivets 12, 12 may be of any flexible or resilient material, but if of cork, they assist in ensuring a smooth take up, particularly if the surfaces stand slightly proud of the annuli, which is automatically effected in the arrangement described. In operation the corks compress during engagement, so that the main load is taken by the annuli, and the rivets are thus preserved from burning.

Owing to the accuracy of alignment obtained, the whole surface of the annuli is used in enengagement, which results in a very high friction force being available. Consequently, not only its normal life, at least, assured for the various parts, but the clutch can be operated at a lower spring pressure than is usual with other clutches of a similar size.

Although some of the advantages of the invention could be obtained by mounting the friction annuli on the flywheel and presser plate, or on such other plates as the laminated clutch plate co-operates with, for the best results the annuli should be mounted upon the laminated plate, and be mounted in a flexible manner as described.

In like manner, some of the advantages of the invention can be obtained by the use of a non-laminated clutch plate having friction annuli attached to it solely by means of cork rivets, but the full advantage is only obtained by the use of a flexible laminated clutch plate.

What I claim as my invention and desire to secure by Letters Patent of the United States is:—

1. A clutch plate incorporating a centre piece, thin metal spider laminations, said laminations being rigidly mounted in staggered relation on said centre piece, each lamination having a rim divided into arcuate portions, a friction annulus, flexible rivets with friction faces securing said annulus to an exterior face of one of the rims.

2. A clutch having a driving plate, a single axially-movable driven plate, said driven plate being formed of flexible metal laminations rigidly secured to one another near their centres, a friction annulus for each lamination, and cork rivets engaging through all of said laminations and annuli supporting said annulus from one of said plates.

3. A clutch plate formed of flexible spoked laminations, each of said laminations having a peripheral rim divided into arcuate portions by small clearances, said laminations being mounted so that the clearances of one lamination are angularly spaced with respect to those of another.

4. A clutch plate formed of thin metal spoked laminations arranged in staggered relation, each of said laminations having a peripheral rim divided into arcuate portions by small clearances.

5. A clutch plate formed of two similar flexible spoked laminations arranged in staggered relation, each of said laminations having a peripheral rim divided into arcuate portions by radial cuts centrally between each adjacent pair of spokes, said laminations being arranged so that the cuts of one lamination are midway between those of the other.

6. A clutch plate, comprising a plate, a friction annulus slidably bearing against the plate, and cork rivets independently of and secured through said plate and annulus for supporting the latter.

7. A clutch plate, comprising a plate, a friction annulus of asbestos fabric, and separate cork rivets engaging the plate and the annulus to support the latter.

8. A clutch plate, comprising laminated metal plates, friction annuli therefor, and independent cork rivets engaging through all of said laminated plates and friction annuli.

9. In a clutch, a clutch plate formed of flexible spoked laminations, each of said laminations having a flat peripheral rim divided into arcuate portions by small clearances between adjacent spokes, means for holding the laminations in constant contact in engaged and disengaged positions of the clutch, friction annuli for the laminations, and a single set of rivets extending through all of the laminations and the annuli for holding the same together.

GEORGE ENOCH STANLEY.